US006446613B1

(12) United States Patent
Djordjevic

(10) Patent No.: US 6,446,613 B1
(45) Date of Patent: Sep. 10, 2002

(54) TWO-STAGE PRESSURE LIMITING VALVE

(75) Inventor: Ilija Djordjevic, East Granby, CT (US)

(73) Assignee: Stanadyne Corporation, Windsor, CT (US)

( * ) Notice: Subject to any disclaimer, the term of this patent is extended or adjusted under 35 U.S.C. 154(b) by 0 days.

(21) Appl. No.: 10/034,917

(22) Filed: Dec. 20, 2001

(51) Int. Cl.[7] .......................... F02M 37/04; F16K 21/04
(52) U.S. Cl. ................... 123/514; 123/456; 137/516.27
(58) Field of Search ................................ 123/514, 506, 123/456, 467, 459, 462; 137/516.27, 565.35, 505.12

(56) References Cited

U.S. PATENT DOCUMENTS

| | | | | | |
|---|---|---|---|---|---|
| 3,027,913 | A | * | 4/1962 | Chatham et al. | 137/516.27 |
| 5,039,284 | A | * | 8/1991 | Talaski | 417/366 |
| 5,295,469 | A | * | 3/1994 | Kariya et al. | 123/456 |
| 5,669,356 | A | * | 9/1997 | Wall et al. | 123/467 |
| 5,832,954 | A | * | 11/1998 | Shafer | 137/543.15 |
| 6,116,217 | A | * | 9/2000 | Klopfer | 123/467 |
| 6,125,822 | A | * | 10/2000 | Janik et al. | 123/457 |
| 6,244,253 | B1 | * | 6/2001 | Haeberer et al. | 123/514 |
| 6,345,609 | B1 | * | 2/2002 | Djordjevic | 123/509 |
| 6,352,085 | B1 | * | 3/2002 | Morita et al. | 137/516.27 |

* cited by examiner

*Primary Examiner*—Carl S. Miller
(74) *Attorney, Agent, or Firm*—Alix, Yale & Ristas, LLP

(57) ABSTRACT

A two stage pressure limiting valve comprises a valve member arranged for axial movement in a bore. The valve member is biased to close a side spill port and a valve opening communicating with a source of high pressure. Pressure at the valve member/valve seat interface in excess of a threshold value forces the valve member away from the seat whereby a pressure relief volume of fluid is permitted to flow through the valve member itself. Sustained high pressure forces the valve member further away from the valve seat to open a side spill port and establish a larger diversion of fluid at a stable lower pressure level.

24 Claims, 3 Drawing Sheets

TWO-STAGE PRESSURE LIMITING VALVE

BACKGROUND OF THE INVENTION

1. Field of the Invention

The present invention relates to fuel pumps and, more particularly, to fuel pumps and common rail systems for supplying fuel at high pressure for injection into an internal combustion engine.

2. Description of the Related Art

Modern gasoline fueled automotive internal combustion engines utilize a gasoline direct injection (GDI) system in which highly pressurized fuel, is injected through nozzles directly into each engine cylinder. In a typical GDI system, a high-pressure (200 bar and higher) supply pump is employed which pressurizes fuel received from a low-pressure circuit (2–4 bar) including, e.g., a fuel tank and a low-pressure fuel pump. One such high-pressure supply pump is described in U.S. patent application Ser. No. 09/342,566 filed Jun. 29, 1999, and assigned to the assignee of the present invention. The goal of a GDI system is to inject a vaporized, accurately metered quantity of fuel that is accurately timed for clean combustion. Accurate regulation of the pressure generated by the high pressure supply pump is essential because variations of the supply pressure to the fuel injectors will directly affect both the quantity of fuel and the quality of atomization provided during any given injection event. U.S. patent Ser. No. 09/638,286 filed Aug. 14, 2000 describes a self-regulating gasoline direct injection system in which pressure detection and feedback systems are used to stabilize the supply pressure for a common rail fuel injection system. The self-regulating system monitors pressure in an accumulator for the common rail, adding pressurized fuel when needed and diverting the output of the high-pressure supply pump at a lower pressure when pressure in the accumulator is adequate. This system avoids wasteful pressurization of fuel when it is not needed, saving energy and avoiding excessive heat generated by the depressurization of unnecessarily pressurized fuel.

It is known that forced re-circulation of highly pressurized fuel into a high pressure supply pump for a GDI system will quickly overheat the GDI pump and possibly result in catastrophic failure. Therefore, extended periods of forced high-pressure re-circulation must be avoided. In addition, failure of the primary pressure regulator or some other GDI component can result in pressures in the GDI system exceeding the design objectives of components resulting in leakage and/or failure.

Thus, there is a need in the art for a pressure limiting valve for a GDI pump that is responsive to excessive pressure having a duration that indicates system malfunction.

SUMMARY OF INVENTION

An object of the present invention is to provide a new and improved two-stage pressure limiting valve for a GDI pump that prevents pressure related failure of GDI components.

Another object of the present invention is to provide a new and improved pressure limiting valve for a GDI pump which absorbs short duration pressure spikes without affecting overall GDI system performance.

A further object of the present invention is to provide a new and improved two stage-pressure limiting valve for GDI pump capable of diverting the large flow of pressurized fuel resulting from failure of a primary pressure regulator or other GDI system component.

These and other objects of the invention are achieved by a two-stage pressure limiting valve in accordance with the present invention. A preferred embodiment of the two-stage pressure limiting valve comprises a cup-like plunger with an integrated hemispherical ball check member positioned adjacent a complementary valve seat. The plunger is arranged for reciprocal movement in a bore defined by the pump housing. The plunger forms a barrier between a first hydraulic chamber surrounding the ball check and valve seat (the valve chamber) and a second hydraulic chamber within and beneath the plunger. The ball check end of the plunger defines a narrow gage fuel flow passage connecting the valve chamber to the interior of the plunger. A control spring disposed in the plunger bore biases the plunger and its associated ball check against the valve seat. The valve seat defines an opening which is exposed to the high-pressure output passage of a supply pump. A further hydraulic passage communicates between the plunger bore and the interior of the pump housing, i.e., the sump.

The plunger, plunger bore and hydraulic passage to the sump are configured to provide two alternative fluid flow paths. A first, limited volume path is defined through the narrow gage opening in the plunger and around or through the plunger skirt to the sump passage. This first path does not require significant displacement of the plunger within its bore. A second, large volume path is opened when the plunger is forced back in its bore against the force of the control spring. When the plunger moves away from the valve seat a pre-determined distance, the outer periphery of the plunger acts as a valve to uncover the sump passage. The second, large volume path extends directly from the valve chamber into the sump passage.

Under normal engine operating conditions, e.g., when fuel pressure at the output passage of the supply pump is below a pre-established upper limit, the ball check will remain firmly seated against the valve seat by the bias spring. In the event of a short duration pressure spike, the ball check will lift from its seat and a small quantity of fuel to be vented into the valve chamber. The vented fluid will then pass through the narrow gage passage to the interior of the plunger and subsequently into the sump passage. When the output pressure of the supply pump exceeds the pre-established upper limit for an extended duration, the narrow gage passage in the plunger is no longer capable of diverting the volume of fuel necessary to reduce pressure to an acceptable level. The excess fuel accumulates in the valve chamber, forcing the plunger away from the valve seat and opening the second large volume fuel pathway into the sump passage. The plunger will remain in this position to divert the large quantity of fuel necessary until the problem causing the excess pressure is corrected.

Collapse of the control spring due to excessive pressure permits the plunger to move to a position where large quantities of fuel are re-circulated into the pump housing. This re-circulation position represents a new stable state at a much reduced pressure, e.g., 30 bar, from the normal operating pressure of the supply pump, e.g., in excess of 200 bar. The GDI electronic control unit (ECU) may be programmed to detect this new lower stable state condition and place the GDI system in a limp home mode, permitting the vehicle to be driven to the closest service station for repair of the underlying problem.

BRIEF DESCRIPTION OF THE DRAWINGS

These and other objects, features and advantages of the invention will become readily apparent to those skilled in the art upon reading the description of the preferred embodiments in conjunction with the accompanying drawings in which.

DETAILED DESCRIPTION OF THE PREFERRED EMBODIMENT

Figure 4:
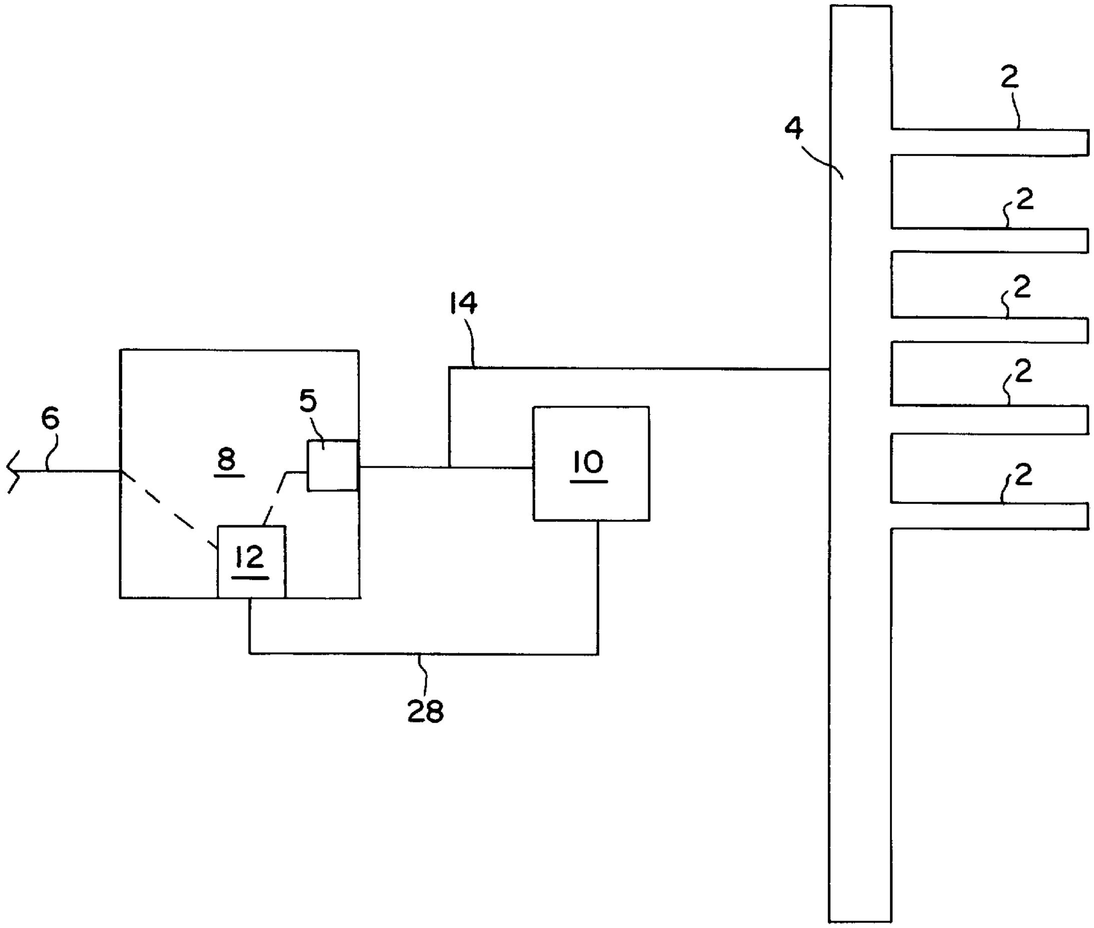
FIG. 4 is a schematic diagram illustrating the two-stage pressure limiting valve in the context of a simplified gasoline direct injection system.

With reference to the drawings in which like numerals represent like parts throughout the several Figures, a two-stage pressure limiting valve in accordance with the present invention is generally designated by the numeral 10. FIG. 4 illustrates the two stage pressure limiting valve 10 in the context of a simplified gasoline direct injection system including a high pressure supply pump 8 and common rail 4. The high pressure supply pump 8 is provided with low pressure fuel through a feed line 6. Low pressure fuel is drawn from the sump 12 and pressurized by pumping means 5. High pressure fuel is fed to the common rail 4 through the high pressure output passage 14 of the pump 8. Metered quantities of fuel are released from the pressurized common rail 4 into the combustion chambers of an internal combustion engine (not shown) by the injectors 2. The two stage pressure limiting valve 10 is arranged to limit the pressure delivered to the common rail 4 by diverting fluid back to the sump 12 through a low pressure sump passage 28. A two-stage pressure limiting valve in accordance with the present invention may be used in association with any high-pressure pump whether or not the pump is equipped with a primary pressure regulator. Therefore, the configuration and operation of the high-pressure supply pump and/or primary pressure regulator will not be further discussed herein.

A preferred embodiment of the two-stage pressure limiting valve 10 may be incorporated into the housing 40 of a high-pressure supply pump (as illustrated herein) or may be provided as a separate component. The pump housing 40 defines a sump chamber 12, which is typically filled with fuel at a relatively low feed pressure of between 2 and 4 bar. The pressurizing mechanism of the pump (not shown) draws low pressure fluid from the sump chamber 12, pressurizes the fuel to a typical pressure of 200 bar or above, and delivers the pressurized fuel to a high pressure output passage 14.

The illustrated preferred embodiment of a two-stage pressure limiting valve 10 comprises a plunger 18, a valve seat 16, and a control spring 20. The plunger 18 and control spring 20 are arranged in a bore 25 defined by the pump housing 40. The cup-shaped plunger 18 includes a skirt 19 projecting axially away from the valve seat 16. The control spring 20 is surrounded by the plunger skirt 19 and is arranged to bias an integral hemispherical ball check 17 against a complementary valve seat 16. The spring 20 is preferably a constant rate coil spring selected to minimize rail pressure variation during the first stage of valve operation. The fluid passage 22 in the valve seat 16 defines a first “active area” or area of the plunger exposed to rail pressure. This first active area is utilized during the first stage of valve operation. When the volume of fluid passing through the fluid passage 22 exceeds the volume capacity of the narrow gage hydraulic passage 23, the plunger 18 is forced away from the valve seat to expose a second, larger “active area” exposed to the rail pressure. This second active area comprises the valve end of the plunger 18. It will be understood that an equivalent rail pressure acting on the larger second active area will produce a correspondingly larger force on the plunger 18.

The valve seat 16 defines a fluid passage 22 in communication with the high-pressure output passage 14 of the pump. A valve chamber 24 is defined at the end of the bore 25 adjacent the valve seat 16. A narrow gage hydraulic passage 23 through the plunger 18 connects the valve chamber 24 with a second hydraulic chamber 27 defined by the plunger skirt 19 and plunger bore 25. A sump passage 28 connects the bore 25 with the sump chamber 12. One portion 26 of the bore 25 has an enlarged diameter, whereby a coaxial hydraulic passage 29 is defined between the piston skirt 19 and the pump housing 40. The coaxial hydraulic passage 29 permits fluid flow from the second hydraulic chamber 27 into the sump passage 28.

Figure 1:
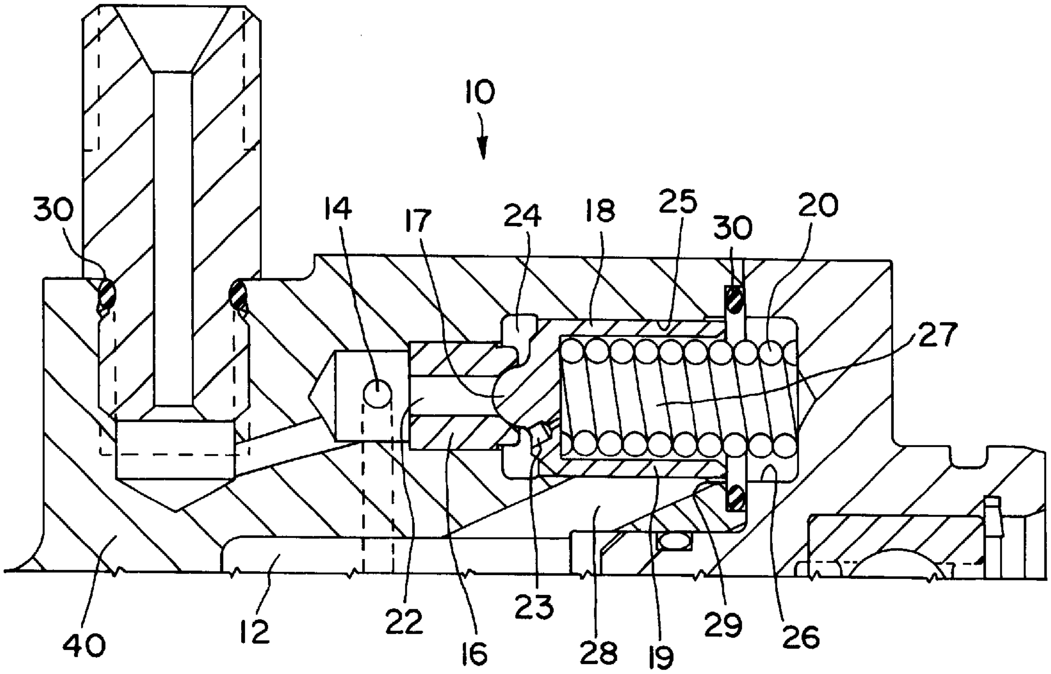
FIG. 1 is a sectional view through a two-stage pressure limiting valve in accordance with the present invention.
Figure 2:
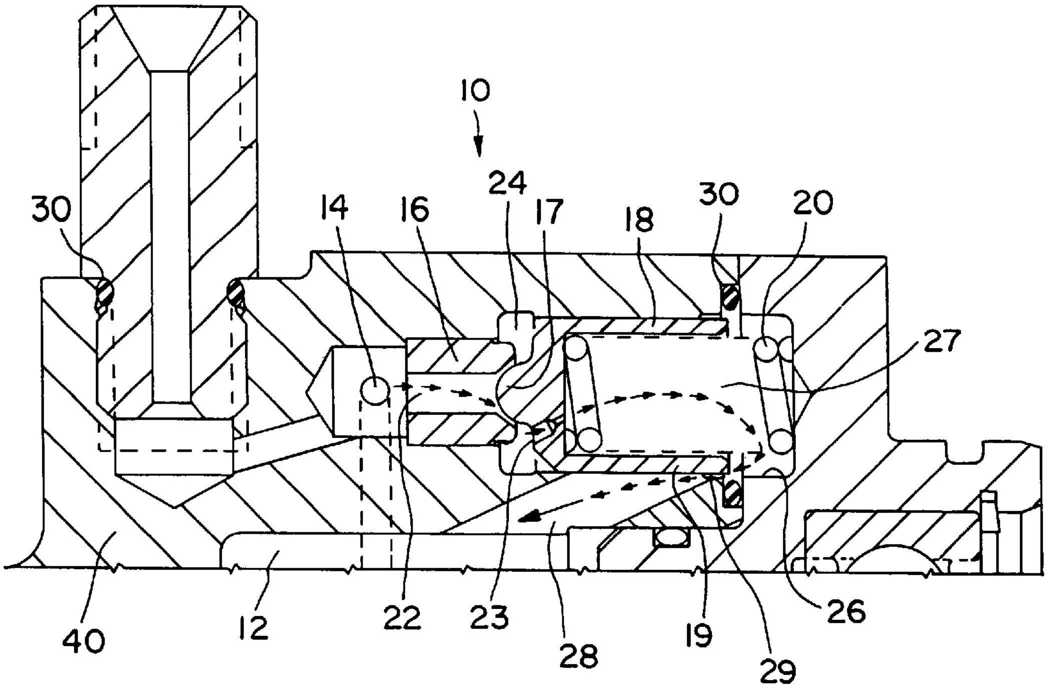
FIG. 2 shows the two-stage pressure limiting valve of FIG. 1 responding to a pressure spike.

FIG. 1 illustrates the relative positions of the plunger 18, valve seat 16, and control spring 20 under normal pump operating conditions. Restated, FIG. 1 illustrates the relative positions of the components of the two-stage pressure limiting valve when the output pressure generated by the pump is below some pre-established maximum, e.g., 200 bar. It should be understood that fuel pressure at the high-pressure output passage 14 of the pump may frequently exceed the pre-established upper limit for brief periods. FIG. 2 illustrates the relative positions of the components of the two-stage pressure limiting valve in response to such a short duration pressure “spike”.

The term “spike” as used in this application is defined as a short duration pressure rise, lasting for a small percentage of the duration of one system cycle. The duration of a typical pressure spike will be measured in microseconds, while the system cycles are typically measured in milliseconds. Spikes are caused by sudden events in the hydraulic system, for example, sudden changes in flow velocity, sudden change in flow direction, or the impact of a valve on its seat (creating a hydraulic pressure wave known as a “water hammer”), etc. Spikes created by these events propagate by wave motion travelling at the speed of sound through the entire hydraulic system. Occasionally, pressure waves from different sources (or reflected waves from the same source) can superimpose on one another, resulting in pressure spikes having an effective pressure corresponding to a multiple of the nominal system pressure. Pressure spikes are in contrast to longer lasting pressure rises typically referred to as pressure “surges”.

A pressure spike will cause the ball check 17 to lift from its seat 16 and vent a small amount of fuel into the valve chamber 24. From the valve chamber 24, the vented fuel passes through the narrow gage hydraulic passage 23 and into the second hydraulic chamber 27. The vented fuel then flows radially outwardly and axially through coaxial passage 29 as indicated by the dashed line and arrow of FIG. 2.

Thus, FIG. 2 illustrates the first stage of the two-stage pressure limiting valve. During the first stage, small quantities of fuel can be vented from the high pressure output passage 14 of the pump through the valve seat 16/ball check 17 interface, valve chamber 24, narrow gage hydraulic passage 23, second hydraulic chamber 27, coaxial passage 29 and sump passage 28 to return to the pump sump chamber 12. When the pressure spike has passed, control spring 20 re-seats the ball check 17 against the valve seat 16 and the GDI system is permitted to continue functioning as normal.

Figure 3:
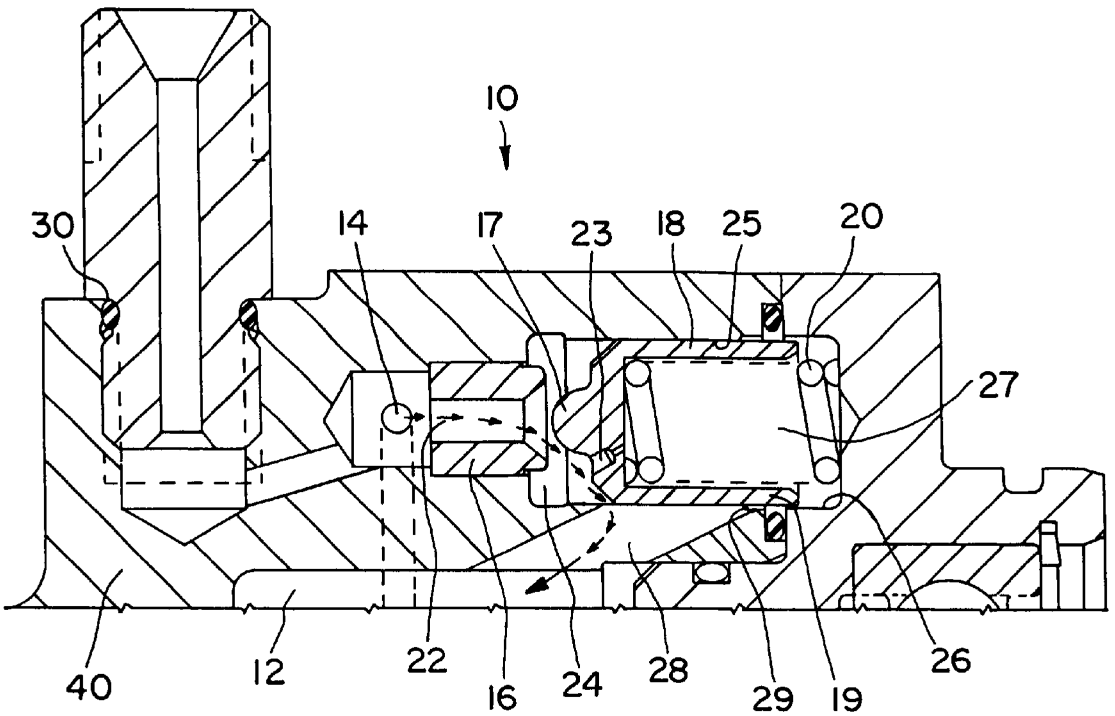
FIG. 3 shows the two-stage pressure limiting valve of FIG. 1 responding to a long duration over-pressure condition.

In the event of a more significant failure, for example, failure of the primary pressure regulator or some major fuel injection component, pressure at the high-pressure output passage 14 of the pump may exceed the pre-established limit for an extended duration. Under such circumstances, the volume of fuel that must be re-circulated to relieve the overpressure condition will be greater than the amount of fuel that can pass through passage 23 as illustrated in FIG. 2. FIG. 3 illustrates the relative positions of the valve seat 16 and plunger 18 in response to a pressure surge or overpressure condition of extended duration. The initial surge of pressure will result in relative positions as illustrated in FIG. 2. However, the volume of fuel entering the valve chamber 24 will exceed the volume of fuel which can pass through the narrow gage hydraulic passage 23. Therefore, the volume of fluid in chamber 24 will increase, forcing the plunger 18 away from the valve seat 16 and ultimately collapsing the control spring 20.

Movement or displacement of the plunger 18 away from the valve seat 16 causes the upper shoulder of the plunger to open a second, larger fluid passage or side spill port directly from the valve chamber 24 into the sump passage 28. So long as the volume of fluid entering the valve chamber 24 exceeds the volume of fluid which may pass through the narrow gage hydraulic passage 23, the relative positions of the plunger 18 and valve seat 16 will remain those illustrated in FIG. 3. Fluid flow under these circumstances is illustrated by the dashed line and arrow in FIG. 3.

If the conditions that produce excessive pressure at the pump high pressure output passage 14 are substantially permanent, the component positions illustrated in FIG. 3 will be maintained, establishing a new stable state at a pressure level of preferably 25 and 35 bar. As soon as the electronic control module for the GDI system detects this stable reduced pressure level, the ECU will enter a limp home mode where the injection is advanced to permit the affected vehicle to be driven to the nearest service station for repair. When the vehicle is turned off and the excessive flow through the valve seat orifice 22 is stopped the plunger 18 and associated ball check will automatically re-seat and normal GDI operation can resume, assuming that the underlying problem has been corrected.

During stage one of valve operation, the pressure is regulated at the valve member 17/valve seat 16 interface as a balance between the hydraulic force acting over a small exposed plunger area and a pre-determined spring force. During stage two of valve operation, the valve member is far away from the valve seat and pressure regulation occurs as a balance between hydraulic force acting over the larger frontal area of the plunger 18 and a slightly higher spring force exerted by the now compressed control spring 20. One working example is a high pressure supply pump having a normal output pressure of 200 bar and a two stage pressure limiting valve designed to have a threshold pressure pressure 20 to 30 bar above the normal output pressure of the pump. The threshold pressure may typically be between 10 and 20% above the normal rail operating pressure.

The flow volumes triggering the transition between first and second stage valve operation will depend on the nominal output volume and pressure of the high pressure supply pump. Another factor is the maximum heat release (from re-circulated high pressure fuel) that can be tolerated without creating vapor cavities in the sump of the pump and/or without compromising the integrity of pump components. The relationship between the first and second flow volumes may be manipulated by selection of the following parameters: diameter of plunger 18, flow area across valve seat 16, flow area of the narrow gage hydraulic passage 23, spring rate of spring 20 as well as the location and geometry of the sump passage 28. As an initial design parameter, the transition between first and second stage valve operation may be selected to occur at approximately 10% of the nominal pump output volume at maximum speed. Although the relative percentile of this transition flow volume will increase at lower pump speeds, the total amount of released heat will also decrease. The second flow volume may be between 8 and 10 times the first flow volume.

While a preferred embodiment of the invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. In a gasoline direct injection fuel supply system having a high pressure fuel supply pump discharging into a common rail to which a plurality of fuel injectors are fluidly connected, an improved pressure limiting device fluidly connected to the discharge of the fuel supply pump for limiting the maximum pressure of the fuel discharged to the rail by diverting pressurized fuel to a sump, comprising:

a body having a bore, a high pressure input passage fluidly connected to the high pressure discharge of the pump and a low pressure output passage fluidly connecting the bore to the sump;

a valve seat formed in the high pressure passage;

a piston displaceable in the bore and at least partially covering the low pressure output passage and having a valve member at one end complementary to the valve seat, said piston defining an orifice through the piston fluidly connected with the sump;

means for biasing the piston toward the high pressure passage such that the valve member sealingly engages the valve seat to isolate the high pressure passage from the sump when the pressure in the high pressure passage does not exceed said maximum pressure;

a first flow path through said orifice to the sump, said first flow path being exposed to the high pressure fluid and initially providing the sole flow path to the sump when the high pressure exceeds said maximum pressure and displaces the piston from the valve seat;

wherein sustained pressure in the high pressure passage above said maximum pressure further displaces said piston to open said low pressure output passage and establish a second flow path between the high pressure passage and the sump that bypasses said orifice, said second flow path having a greater capacity than said first flow path.

2. The improved pressure limiting device of claim 1, wherein said bore and said piston comprise a generally cylindrical shape having a longitudinal axis and said valve member comprises a generally convex hemispherical axial projection.

3. The improved pressure limiting device of claim 1, wherein said piston defines a receptacle for said means for biasing, said receptacle axially opposed to said valve member.

4. The improved pressure limiting device of claim 1, wherein said means for biasing comprises a spring compressively engaged between said piston and said body.

5. The improved pressure limiting device of claim 1, wherein said orifice is located radially outwardly of said valve member.

6. The improved pressure limiting device of claim 1, wherein the capacity of said second flow path is 8 to 10 times the capacity of said first flow path.

7. The improved pressure limiting device of claim 1, wherein said body is defined within a housing of said high pressure fuel supply pump.

8. A two stage fluid pressure limiting valve comprising:

a body defining a bore, a high pressure input passage, a low pressure output passage and a side spill port connecting said bore with said low pressure output passage;

a valve seat associated with an opening between said high pressure passage and said bore;

a plunger arranged for reciprocal movement in said bore to selectively close and open said valve seat opening and said side spill port, said plunger extending from a first end comprising a valve member adjacent and complementary to said valve seat to a second end, said plunger defining a restricted flow passage having a predetermined capacity extending from said first end to said second end; and control bias means for biasing said valve member into a seated position in which said valve member closes said valve seat opening and said plunger closes said side spill port;

wherein said bore, plunger first end and valve seat define a first hydraulic chamber and said bore and plunger second end define a second hydraulic chamber in fluid communication with said low pressure output passage, said first and second hydraulic chambers being fluidly isolated when fluid pressure in said high pressure input passage is below a threshold pressure and fluidly connected through said restricted flow passage when fluid pressure in said high pressure input passage exceeds a threshold pressure and unseats said valve member;

whereby in a first stage of operation fluid flows through said opening into said first hydraulic chamber and subsequently through said restricted flow passage and second hydraulic chamber into said low pressure output passage at a first flow volume up to the predetermined capacity of said restricted flow passage, and in a second stage of operation fluid entering said first hydraulic chamber in excess of said first flow volume forces said plunger away from said valve seat against said control bias means, thereby opening said side spill port to permit fluid flow from said first hydraulic chamber into said low pressure output passage at a second flow volume, the second flow volume being greater than the first flow volume.

9. The two stage fluid pressure limiting valve of claim 8, wherein said bore and said plunger comprise a generally cylindrical shape having a longitudinal axis and said valve member comprises a generally convex hemispherical axial projection from said plunger first end.

10. The two stage fluid pressure limiting valve of claim 8, wherein said plunger second end defines an axial bore extending toward said first end and said restricted flow passage communicates with said axial bore.

11. The two stage fluid pressure limiting valve of claim 10, wherein said control bias means comprises a spring disposed within said plunger axial bore and compressively engaged between said plunger and said body.

12. The two stage fluid pressure limiting valve of claim 9, wherein said restricted flow passage is located radially outwardly of said valve member.

13. The two stage fluid pressure limiting valve of claim 8, wherein said threshold pressure is between 20 and 30 bar above the nominal rail pressure.

14. The two stage fluid pressure limiting valve of claim 8, wherein said first flow volume is selected to prevent excessive heat development in the sump of said pump.

15. The two stage fluid pressure limiting valve of claim 8, wherein said second flow volume is 8 to 10 times greater than said first flow volume.

16. The two stage fluid pressure limiting valve of claim 8, wherein said body is defined within a pump housing, said pump housing further defining a sump chamber, said low pressure output being in fluid communication with said sump chamber.

17. A fuel injection supply pump comprising:

a pump housing defining a sump chamber, a high pressure output passage, a low pressure return passage fluidly communicating with said sump chamber, a bore having an axial length and a side spill port fluidly connecting said bore to said sump chamber;

a valve seat defining an opening fluidly communicating between said high pressure output passage and said bore, a valve member movably disposed within said bore, said valve member having an axial length extending from a first end complementary to said valve seat to a second end, said valve member defining a passage through the axial length of said valve member, said passage having a maximum flow capacity for a given fluid pressure; and wherein said valve member is biased toward a seated position in which said valve member first end is sealingly engaged with said valve seat and covering said side spill port to define a hydraulic chamber radially delimited by said bore and axially delimited by said valve member first end and said valve seat, said valve member responsive to a fluid pressure in said high pressure output passage in excess of a threshold pressure to move from said seated position, whereby fluid flows through said valve seat opening into said hydraulic chamber and subsequently through said valve member passage, low pressure output passage and into said sump chamber at the maximum flow capacity of said valve member passage, fluid entering said hydraulic chamber in excess of said valve member passage maximum flow capacity moving said valve member away from said valve seat against said bias, thereby opening said side spill port to permit fluid to flow from said hydraulic chamber into said low pressure return passage at a second flow volume greater than the maximum flow capacity of said valve member passage.

18. The fuel injection supply pump of claim 17, wherein said pump generates a normal operating pressure of 200 bar and said threshold pressure level is approximately 20 bar above said normal operating pressure.

19. The fuel injection supply pump of claim 17, wherein said second flow volume is 8 to 10 times greater than said maximum flow capacity of said valve member passage.

20. The fuel injection supply pump of claim 17, wherein said valve member is biased against said valve seat by a spring disposed in said bore.

21. A pressure relief valve for releasing a fluid under pressure comprising:

a body having a bore extending from a high pressure inlet to a low pressure outlet, said body defining a side spill port connecting said bore to said low pressure outlet;

a valve seat defining an opening in fluid communication with said high pressure inlet;

a valve member movably disposed within the bore and engageable With the valve seat and comprising a valve body for selectively closing and opening said side spill port, said valve body defining an axial hydraulic passage through said valve member, said axial hydraulic passage in fluid communication with said low pressure outlet; and a bias interconnected with said valve member and urging said valve member against said valve seat to close said valve seat opening and said side spill port, wherein said valve member is responsive to a fluid pressure at said high pressure outlet in excess of a threshold pressure to relieve pressure by releasing fluid through said valve seat opening and axial hydraulic passage at a first volume dependent upon the flow capacity of said axial hydraulic passage, fluid flow through said valve seat opening in excess of said first volume forcing said valve member away from said valve seat to open said side spill port to release fluid at a second volume, said second volume being greater than said first volume.

22. The pressure relief valve of claim 21, wherein said pump has a normal operating pressure and said threshold pressure is approximately 10% above the normal operating pressure of said pump.

23. The pressure relief valve of claim 21, wherein said body is defined within the housing of a supply pump for a gasoline direct injection system.

24. The pressure relief valve of claim 21, wherein said axial hydraulic passage and said side spill port have cross sectional areas and the area of said side spill port is at least 5 times greater than the area of said axial hydraulic passage.

* * * * *